United States Patent
Aoyagi et al.

(10) Patent No.: US 7,332,882 B2
(45) Date of Patent: Feb. 19, 2008

(54) MOTOR DRIVE DEVICE THAT COMBINED CHARGE CONTROLLER

(75) Inventors: Shigehisa Aoyagi, Hitachi (JP); Tsunehiro Endo, Hitachiota (JP); Hidefumi Shirahama, Hitachi (JP); Yoshiki Ito, Naka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/493,820

(22) Filed: Jul. 27, 2006

(65) Prior Publication Data

US 2007/0024219 A1 Feb. 1, 2007

(30) Foreign Application Priority Data

Jul. 27, 2005 (JP) .............................. 2005-216648

(51) Int. Cl.
H02P 27/00 (2006.01)
H02J 7/10 (2006.01)

(52) U.S. Cl. ................. 318/139; 318/801; 320/107; 320/141; 363/40; 363/131; 363/164

(58) Field of Classification Search ............... None
See application file for complete search history.

(56) References Cited

U.S. PATENT DOCUMENTS

| | | | | | |
|---|---|---|---|---|---|
| 4,779,050 | A | * | 10/1988 | Ohnari | 324/426 |
| 5,182,508 | A | * | 1/1993 | Schauder | 318/801 |
| 5,291,388 | A | * | 3/1994 | Heinrich | 363/98 |
| 5,912,545 | A | * | 6/1999 | Monet et al. | 320/107 |
| 6,239,581 | B1 | * | 5/2001 | Yoshida | 320/162 |
| 6,794,847 | B2 | * | 9/2004 | Hosoda et al. | 320/104 |
| 2003/0146737 | A1 | * | 8/2003 | Kadouchi et al. | 320/132 |
| 2007/0165433 | A1 | * | 7/2007 | Katooka et al. | 363/142 |

FOREIGN PATENT DOCUMENTS

| | | |
|---|---|---|
| JP | 07-087616 | 3/1995 |
| JP | 2004-064903 | 2/2004 |
| JP | 2005-045848 | 2/2005 |
| JP | 2005-168149 | 6/2005 |
| JP | 2006-67754 | 3/2006 |

* cited by examiner

*Primary Examiner*—Lincoln Donovan
*Assistant Examiner*—Eduardo Colon Santana
(74) *Attorney, Agent, or Firm*—Antonelli, Terry, Stout & Kraus, LLP.

(57) ABSTRACT

A voltage detector is connected to a connection terminal connected to one phase of an AC output of an inverter through a diode. A removable charge power supply is connected to said connection terminal and another connection terminal. A charge-power-supply connection judging circuit judges whether the charge power supply is or isn't connected, based on a charge power supply voltage detected by a voltage detector. A mode change control circuit outputs switch signal by the result of said judgment. By receiving this switch signal, the inverter controller switches the operation of the inverter between the Motor Drive mode or the Battery Charge mode.

Thereby, a motor drive device detects a connecting status of an external charge power supply and steadily switches the operation of the inverter between the Motor Drive mode or the Battery Charge mode.

13 Claims, 6 Drawing Sheets

MOTOR DRIVE DEVICE THAT COMBINED CHARGE CONTROLLER

CLAIM OF PRIORITY

The present application claims priority from Japanese application serial no. 2005-216648, filed on Jul. 27, 2005, the content of which is hereby incorporated by reference into this application.

FIELD OF THE INVENTION

This invention relates generally to a motor drive device which drives a motor using a rechargeable battery as a power supply, and more particularly, to a motor drive device suitable for charge control of a rechargeable battery which is provided together.

BACKGROUND OF THE INVENTION

A motor drive device which drives a motor using a rechargeable battery as a power supply is equipped with a dedicated booster circuit and a rectification circuit to charge the rechargeable battery or uses an inverter device to drive a motor and windings of the motor to chop and boost without using a booster circuit dedicated for a charging circuit as disclosed in Japanese Patent Laid-open No. Hei07 (1995)-87616.

SUMMARY OF THE INVENTION

In Patent document 1 described above, the inverter has two operation modes: Motor Drive mode which does not connect an external AC power supply and Battery Charge mode which connects an external AC power supply and performs boosting to charge the rechargeable battery. The semiconductor switching devices of the inverter function differently in these modes and it is necessary to use any means to judge connection or disconnection of the external AC power supply. However, Patent document 1 does not describe it explicitly.

An object of this invention is to provide a motor drive device capable of doubling as a charge controller which detects the connecting status of an external charge power supply without using any mechanical switches and switches between Motor Drive mode and Battery Charge mode of the inverter.

A motor drive device that doubles as a charge controller in accordance with this invention is equipped with an AC motor, an inverter, a rechargeable battery, a charge power supply, and an inverter controller. The motor drive device contains a Motor Drive mode which converts a DC voltage of the rechargeable battery into an AC voltage by the inverter and supplies the AC voltage to the AC motor and a Battery Charge mode which detects connection of the charge power supply, applies the DC voltage from the rechargeable battery to the inverter through a winding of the AC motor and drives semiconductor switching devices to charge the rechargeable battery.

In accordance with this invention, switching between Motor Drive and Battery Charge modes can be reliably executed by the output of a means to detect connection or disconnection of a charge power supply.

DESCRIPTION OF THE PREFERRED EMBODIMENTS

This invention will now be described in detail with reference to the accompanying drawings.

Figure 1:
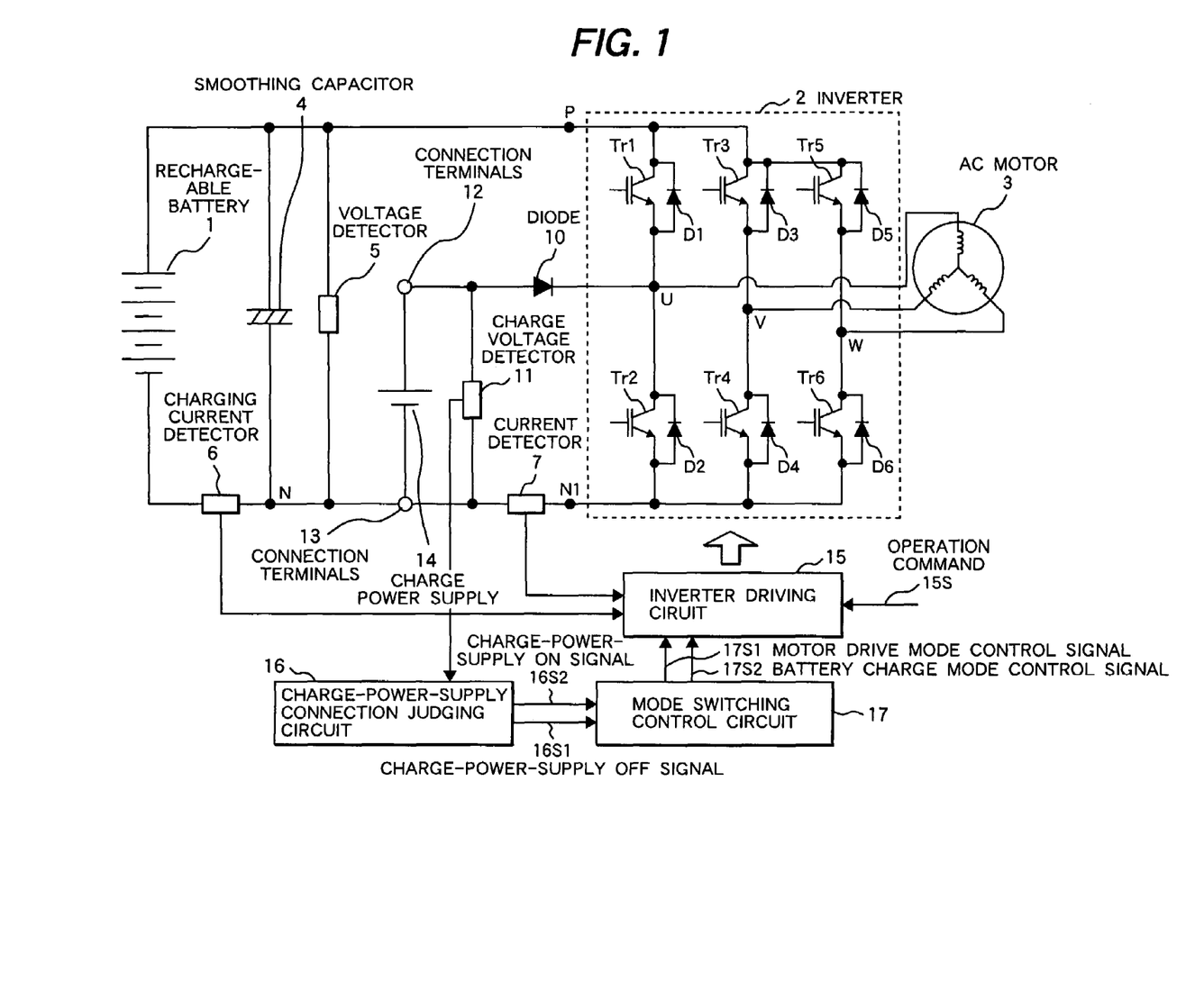
FIG. 1 is a schematic diagram to explain the motor drive device of Embodiment 1 that combines a charge controller of a rechargeable battery.

FIG. 1 shows a motor drive device which doubles as a charge controller of a rechargeable battery in accordance with this embodiment. In FIG. 1, the positive and negative ends of smoothing capacitor 4 are connected to voltage detector 5. The positive pole of smoothing capacitor 4 is connected to the positive pole of rechargeable battery 1 and the negative pole of rechargeable battery 1 is connected to the negative pole of smoothing capacitor 4 via charge current detector 6. The positive pole of smoothing capacitor 4 is connected to positive DC bus line P of inverter 2. Negative DC bus line N1 of inverter 2 is connected to the negative pole of smoothing capacitor 4 via current detector 7 which detects current passing through inverter 2.

Inverter 2 is equipped with three upper arms and three lower arms. Each arm is made with a power semiconductor switching device (Tr1 to Tr6) such as IGBT or power MOSFET and a free wheeling diode (D1 to D6). 3-phase AC outputs of U, V, and W phases of inverter 2 are connected to AC motor 3. Here, AC motor 3 can be a permanent magnet motor that uses a permanent magnet for the rotor.

Inverter driving circuit 15 controls power semiconductor switching devices (Tr1 to Tr6) of inverter 2 by gate driving signals corresponding to the operating mode of the inverter which is Motor Drive or Battery Charge mode. Further, inverter driving circuit 15 also determines whether to drive AC motor 3 actually by operation command 15S in the Motor Drive mode. FIG. 1 shows position-sensor-less control by which inverter driving circuit 15 without a rotor position sensor inputs an inverter current waveform detected by current detector 7, estimates the rotor position, and controls driving of the inverter thereby. However, it is possible that the inverter driving circuit uses position-sensing control by which inverter driving circuit 15 inputs the output of a rotor position sensor to inverter driving circuit 15 and controls driving of AC motor 3.

In this embodiment as shown in FIG. 1, the cathode of diode 10 is connected to the U-phase AC output of inverter 2 and charge voltage detector 11 is connected between the anode of diode 10 and negative end N of smoothing capacitor 4. Further, removable charge power supply 14 is connected to connection terminal 12 which leads to the anode of diode 10 of FIG. 1 and connection terminal 13 which leads to negative end N of smoothing capacitor 4. Here, it is possible to substitute diode 10 by a semiconductor having a small ON resistance such as power MOSFET, IGBT, thyristor, or GTO and turn on/off by the output of charge power supply connection judging circuit 16 or mode switching control circuit 17.

The motor drive device that combines a rechargeable battery charge controller which is an embodiment of this invention is equipped with a charge-power-supply connection judging circuit 16 which inputs a detection voltage from charge voltage detector 11 and judges, by the magnitude of the detection voltage, whether charge power supply 14 is connected. Charge-power-supply connection judging circuit 16 outputs Charge-Power-Supply OFF signal 16S1 or Charge-Power-Supply ON signal 16S2 which is a judgment result signal to mode switching control circuit 17. Upon receiving this judgment result signal, mode switching control circuit 17 outputs Motor Drive Mode control signal 17S1 or Battery Charge Mode control signal 17S2 to inverter driving circuit 15 as the operation mode of inverter 2. Inverter driving circuit 15 receives the output from mode switching control circuit 17 and controls the operation of inverter 2 in Battery Charge mode or Motor Drive mode. It is possible to build up inverter driving circuit 15, charge-power-supply connection judging circuit 16, and mode switching control circuit 17 in individual logic IC chips. However, this embodiment accomplishes them by a microcomputer which is not shown in FIG. 1.

Figure 2:
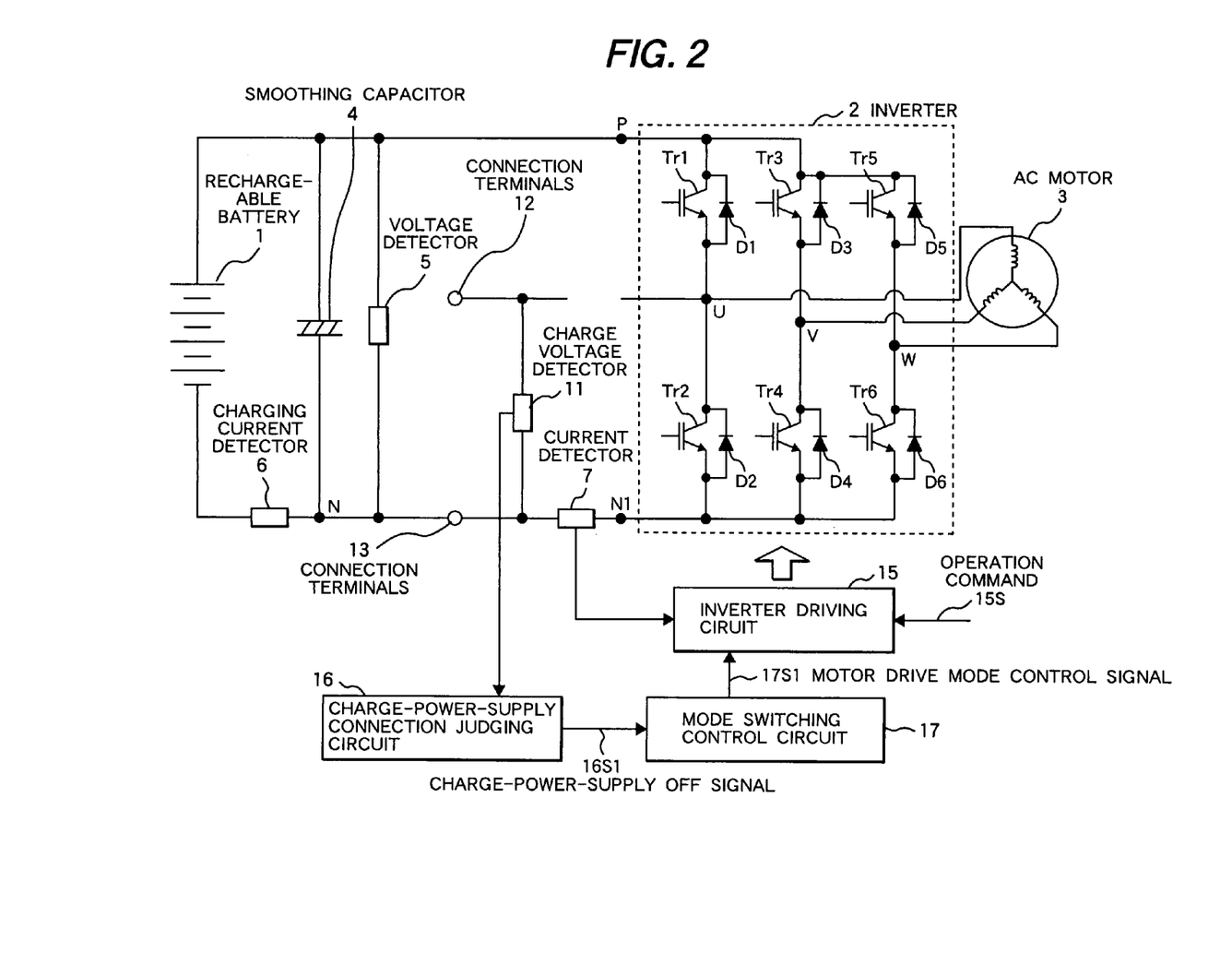
FIG. 2 is a schematic diagram to explain the Motor Drive mode of Embodiment 1.

Below will be explained the Motor Drive mode and the Battery Charge mode in detail. FIG. 2 shows only FIG. 1 sections related to the Motor Drive mode and does not show any other sections. In the Motor Drive mode, charge power supply 14 is not connected. Charge-power-supply connection judging circuit 16 outputs Charge-Power-Supply OFF signal 16S1 according to detection voltage information sent from charge voltage detector 11. On receiving Charge-Power-Supply OFF signal 16S1, mode switching control circuit 17 outputs Motor Drive Mode control signal 17S1. By receiving Motor Drive Mode control signal 17S1 and operation command 15S, inverter driving circuit 15 applies a drive signal which converts a DC voltage output of rechargeable battery 1 to an AC voltage to each gate of power semiconductor switching devices Tr1 to Tr6 of inverter 2. With this, inverter 2 outputs an AC voltage and drives AC motor 3. If operation command 15S is a STOP signal, inverter driving circuit 15 leaves inverter 2 undriven and keeps AC motor 3 stopped.

Figure 3:
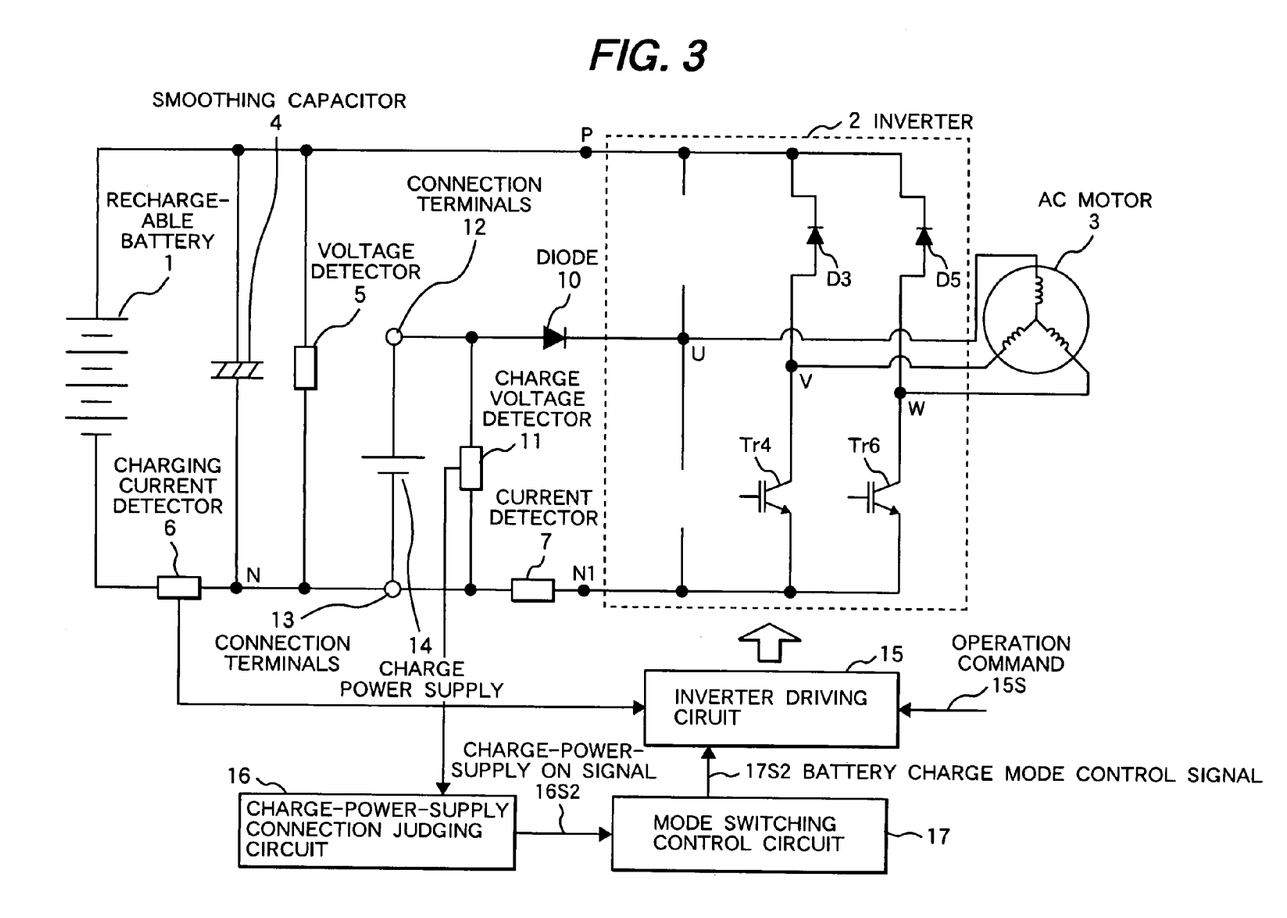
FIG. 3 is a schematic diagram to explain the Battery Charge mode of Embodiment 1.

The operation of the Battery Charge mode is explained below with reference to FIG. 3. FIG. 3 shows only FIG. 1 sections related to the Battery Charge mode and does not show any other sections. In the Battery Charge mode, charge power supply 14 is connected. Charge power supply connection judging circuit 16 outputs Charge-Power-Supply ON signal 16S2 according to detection voltage information sent from charge voltage detector 11. On receiving Charge-Power-Supply ON signal 16S2, mode switching control circuit 17 outputs Battery Charge Mode control signal 17S2. By receiving Battery Charge Mode control signal 17S2, inverter driving circuit 15 turns off upper and lower arms of power semiconductor switching devices Tr1 and Tr2 which are 1-phase outputs of inverter 2. The DC voltage output of charge power supply 14 connected to connection terminals 12 and 13 is applied to power semiconductor switching devices Tr4 and Tr6 of lower arms of the remaining 2 phases via windings of AC motor 3, turns on and off power semiconductor switching devices Tr4 and Tr6, and thus controls charging of rechargeable battery 1.

Substantially, power semiconductor switching devices Tr4 and Tr6 of two phases (V and W phases in FIG. 3) of lower arms of inverter 2 are turned on to flow current to AC motor 3 and store electromagnetic energy in the windings of AC motor 3. Then, while the lower arms of inverter 2 are off, current flows through free wheeling diodes D3 and D5 of upper arms by the stored electromagnetic energy and thus power is applied to rechargeable battery 1 to charge. It is possible to select arms of specific two phases such as V and W phases as arms of inverter 2 which are switched in the Battery Charge mode or to select any phases so that arms of three phases may have the same electric energy after charging of rechargeable battery 1.

The current detected by charge current detector 6 is fed back to inverter driving circuit 15 and durations of switching pulses of power semiconductor switching devices Tr4 and Tr6 are controlled so that the charging current of rechargeable battery 1 may not exceed a constant current or permissible charging current.

Figure 6:
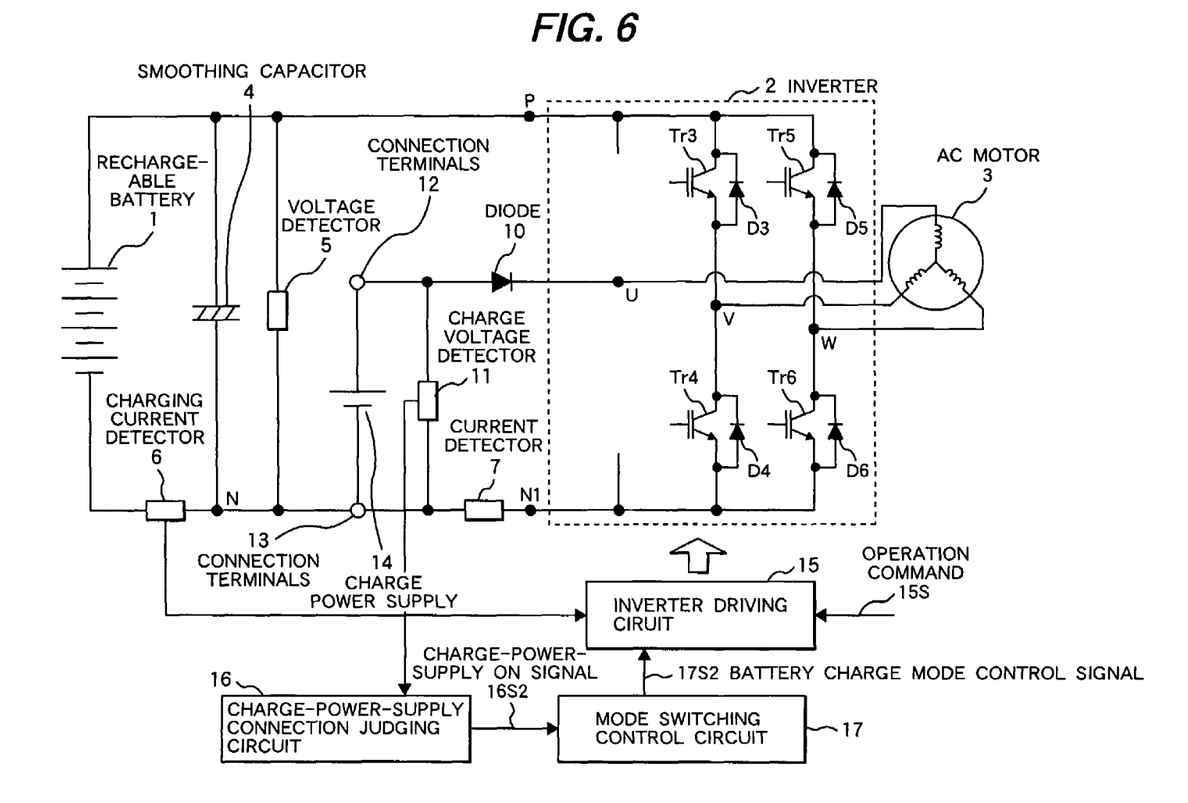
FIG. 6 is a schematic diagram to explain another Battery Charge mode of Embodiment 1.

Further, it is possible to charge rechargeable battery 1 by a synchronous rectification method which turns on the power semiconductor switching devices of upper arms when the power semiconductor switching devices of lower arms are off. In other words, as shown in FIG. 6, power semiconductor switching devices Tr3 and Tr5 of the upper arms are turned on and off to charge rechargeable battery 1 synchronously as power semiconductor switching devices Tr4 and Tr6 of the lower arms are turned on and off.

Figure 4:
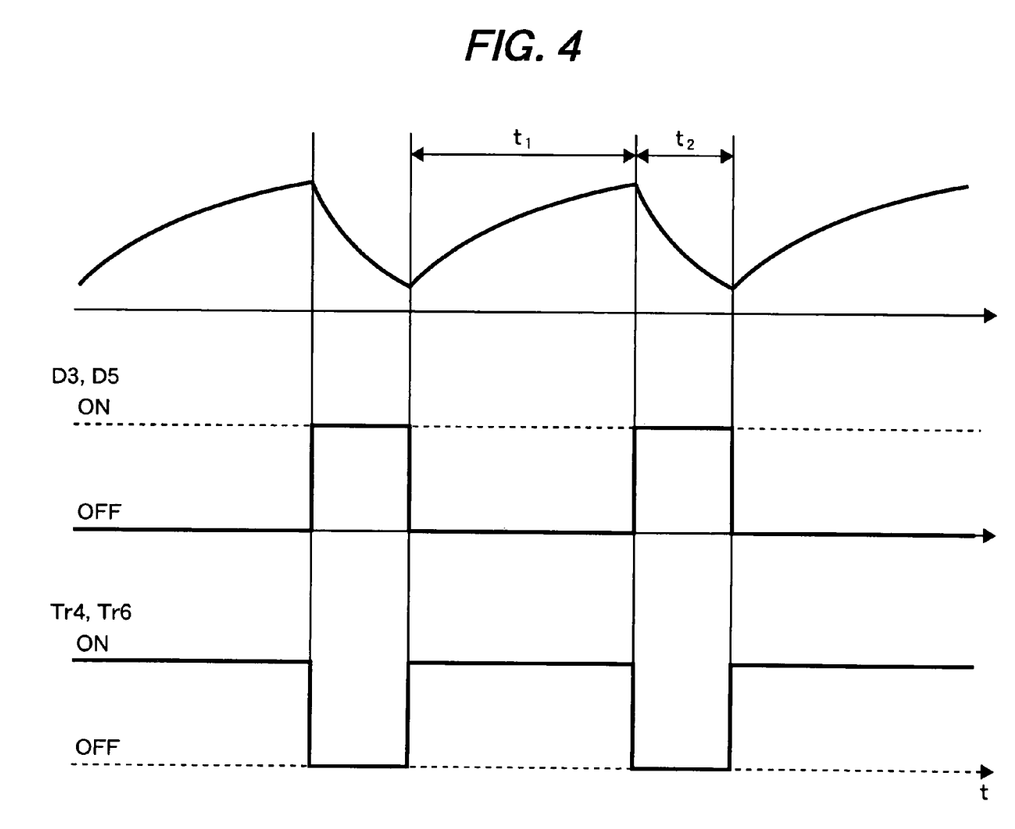
FIG. 4 is a timing chart of the Battery Charge mode of Embodiment 1.

FIG. 4 is a timing chart of a switching pulse command for ON/OFF control of power semiconductor switching devices Tr4 and Tr6 in the Battery Charge mode. When the switching pulse command of FIG. 4 goes to a high level, power semiconductor switching devices Tr4 and Tr6 and free wheeling diodes D3 and D5 are turned on and off. When the switching pulse command of FIG. 4 goes to a high level, power semiconductor switching devices Tr4 and Tr6 and free wheeling diodes D3 and D5 are turned on. When the switching pulse command goes to a low level, power semiconductor switching devices Tr4 and Tr6 and free wheeling diodes D3 and D5 are turned off. In time period t1 of FIG. 4, power semiconductor switching devices Tr4 and Tr6 of lower arms of inverter 2 are turned on and current flows through windings of AC motor 3. As the result, electromagnetic energy is stored in the windings of AC motor 3. In time period t2 of FIG. 4, power semiconductor switching devices Tr4 and Tr6 of lower arms of inverter 2 are turned off and free wheeling diodes D3 and D5 of upper arms are turned on. The electromagnetic energy stored in the windings of AC motor 3 is fed to rechargeable battery 1 through free wheeling diodes D3 and D5 of upper arms. With this, rechargeable battery 1 is charged.

Figure 5:
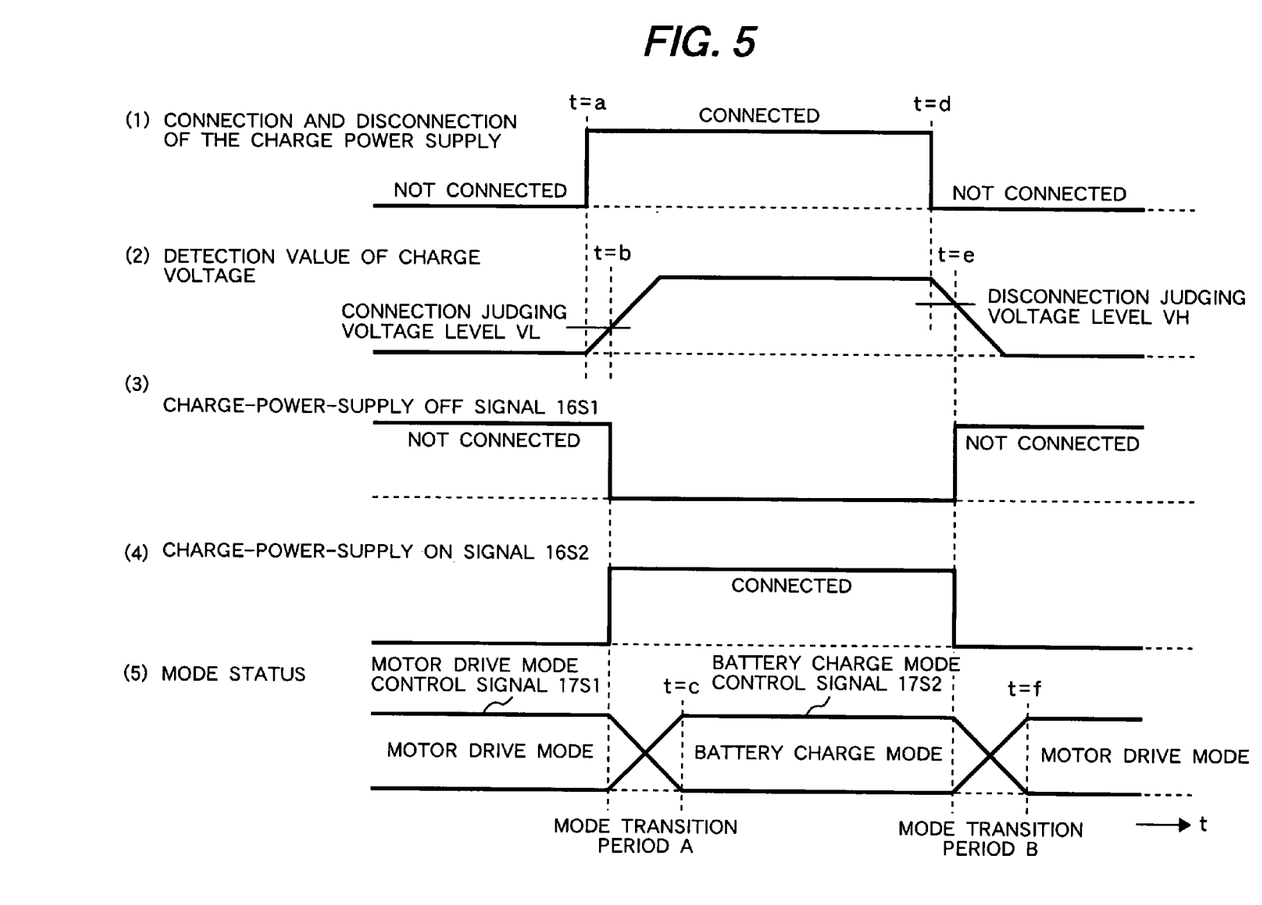
FIG. 5 is a timing chart to explain mode transition of the motor drive device of Embodiment 1 that combines a charge controller of a rechargeable battery between Motor Drive mode and Battery Charge mode.

Next a method will be explained in detail to switch between Motor Drive mode and Battery Charge mode in this embodiment. FIG. 5 is a timing chart which shows mode transitions between Battery Charge mode and Motor Drive mode when charge power supply 14 is connected and disconnected. Waveform (1) of FIG. 5 shows disconnection of charge power supply 14 by the low level of FIG. 5 and connection of charge power supply 14 by the high level. Waveform (2) shows how the detected charging voltage changes when charge power supply 14 is connected and disconnected. Further, waveforms (3) and (4) of FIG. 5 respectively show a change in Charge-Power-Supply OFF signal 16S1 and a change in Charge-Power-Supply ON signal 16S2. Waveform (5) shows a transition between Motor Drive mode and Battery Charge mode.

In a status in which inverter driving circuit 15 is in the Motor Drive mode and charge power supply 14 is not connected, when charge power supply 14 is connected to connection terminals 12 and 13 at time t=a, the detection voltage output from charge voltage detector 11 starts to go up from time t=a and goes over preset voltage level VL for connection judgment at time t=b. When the detection voltage goes over voltage level VL, charge-power-supply connection judging circuit 16 judges that charge power supply 14 is connected, makes Charge-Power-Supply ON signal 16S2 high (to the High level) and Charge-Power-Supply OFF signal 16S1 low (to the Low level). When Charge-Power-Supply ON signal 16S2 goes high, mode switching control circuit 17 changes the level of Motor Drive Mode control signal 17S1 from High to Low and the level of Battery Charge Mode control signal 17S2 from Low to High as shown in FIG. 5. With this, the mode of inverter 2 is switched from Motor Drive mode to Battery Charge mode. In this case, the Battery Charge mode is set at time t=c after mode transition period A as shown in FIG. 5. This mode transition period A between time t=b and time t=c can assure a time period between interruption of operation of inverter 2 and stop of revolution of AC motor 3 even when AC motor 3 is actually running by operation command 15S in the Motor Drive mode.

When charge power supply 14 is disconnected from connection terminals 12 and 13 at time t=d, the detection voltage output from charge voltage detector 11 starts to go down from time t=d and goes below preset voltage level VH for connection judgment at time t=e. When the detection voltage goes below voltage level VH, charge-power-supply connection judging circuit 16 judges that charge power supply 14 is disconnected, makes Charge-Power-Supply OFF signal 16S1 high (to the High level) and Charge-Power-Supply ON signal 16S2 low (to the Low level). When Charge-Power-Supply OFF signal 16S1 goes high, mode switching control circuit 17 changes the level of Motor Drive Mode control signal 17S1 from Low to High and the level of Battery Charge Mode control signal 17S2 from High to Low as shown in FIG. 5. With this, the mode of inverter 2 is switched from Battery Charge mode to Motor Drive mode. In this case, the Motor Drive mode is set at time t=f after mode transition period B as shown in FIG. 5.

The mode transition period B between time t=e and time t=f is used to initialize various kinds of data for motor control required to set the Motor Drive mode. In the new Motor Drive mode after time t=f, AC motor 3 is actually driven or left stopped by operation command 15S at that time point.

As described above, in accordance with this invention, the Battery Charge mode can be held when a status indicating a connection of a charge power supply is output by a connection judging means which outputs a status indicating whether a charge power supply is connected or disconnected and the Motor Drive mode can be held when a status indicating a disconnection of a charge power supply is output. Therefore, the Motor Drive mode and the Battery Charge mode can be exclusively selected. In FIG. 5, the voltage detection levels VL and VH are made different (e.g., VL<VH) to detect connection or disconnection of charge power supply 14. However, the voltage detection levels VL and VH can be equal to each other.

In this embodiment, inverter 2, inverter driving circuit 15 which is a control section of inverter 2, charge-power-supply connection judging circuit 16, and mode switching control circuit 17 can be built in separate packages. It is also possible to mount inverter 2 and the controller on the same package as an intelligent power module. The module which contains inverter 2 and the controller is compact, light-weight, and capable of stopping the motor without fail in the Battery Charge mode. Therefore, the module is suitable for a motor drive device that combines a charge controller of a rechargeable battery which is mounted on an electrically-powered car, motor-driven bike, or motor-assisted bicycle which drives wheels by AC motor 3 powered by rechargeable battery 1. Further, since the module in which inverter 2 and the controller are mounted on the same package is compact and light-weight, it is also suitable for motor control of a cordless vacuum cleaner.

What is claimed is:

1. A motor drive device equipped with an AC motor, an inverter, a rechargeable battery, a charge power supply, and an inverter controller and capable of doubling as a device to control charging of the rechargeable battery, wherein
    the inverter controller of the motor drive device comprises
        a connection judging section for judging whether the charge power supply is connected, and
        a mode switch controller for switching between a Motor Drive mode which converts a DC voltage of the rechargeable battery into an AC voltage by the inverter and supplies the AC voltage to the AC motor and a Battery Charge mode which supplies the DC voltage from the rechargeable battery to the inverter through a winding of the AC motor and drives semiconductor switching devices to charge the rechargeable battery;
    the connection judging section inputs a voltage value detected on the terminals connected to the charge power supply, compares the detected voltage value by a predetermined voltage value, and outputs whether the charge power supply is connected; and
    the mode switch controller inputs the output from the connection judging section and switches between the Motor Drive mode and the Battery Charge mode after a predetermined mode transition period.

2. The motor drive device of claim 1, wherein the inverter controller of the motor drive device interrupts the operation of the inverter in the mode transition period in which the mode changes from Motor Drive mode to Battery Charge mode.

3. The motor drive device of claim 1, wherein the inverter controller of the motor drive device is equipped with an inverter driving circuit which performs position-sensing control by using the output of a sensor which detects the position of the rotor of the AC motor in the Motor Drive mode.

4. The motor drive device of claim 1, wherein the inverter controller of the motor drive device is equipped with an inverter driving circuit which performs position-sensorless control by estimating the rotor of the AC motor in the Motor Drive mode.

5. The motor drive device of claim 1, wherein the inverter controller of the motor drive device is equipped with an inverter driving circuit which drives semiconductor switching devices respectively provided on multiple arms of the inverter in the Battery Charge mode.

6. A motor drive device equipped with an inverter which inputs direct current and outputs three-phase alternating current, a three-phase AC motor, a rechargeable battery, a charge power supply, and an inverter controller and capable of doubling as a device to control charging of the rechargeable battery, wherein
    the inverter controller of the motor drive device comprises
        a connection judging section for judging whether the charge power supply is connected,
        a mode switch controller for switching between a Motor Drive mode which converts a DC voltage of the rechargeable battery into a three-phase AC voltage by the inverter and supplies the three-phase AC voltage to the three-phase AC motor and a Battery Charge mode which supplies the DC voltage from the rechargeable battery to the inverter through a winding of the three-phase AC motor and drives semiconductor switching devices of the inverter to charge the rechargeable battery, and an inverter driving circuit which outputs signals to drive semiconductor switching devices of the inverter;

the connection judging section inputs a voltage value detected on the terminals connected to the charge power supply, compares the detected voltage value by a predetermined voltage value, and outputs whether the charge power supply is connected;

the mode switch controller inputs the output from the connection judging section and switches between the Motor Drive mode and the Battery Charge mode after a predetermined mode transition period; and the inverter driving circuit turns off semiconductor switching devices of upper and lower arms relative to one output phase of the inverter, applies a DC voltage of the charge power supply to semiconductor switching devices of arms which output the other two phases through windings of the three-phase AC motor, and turns on and off semiconductor switching devices of arms which output the other two phases.

7. The motor drive device of claim 6, wherein the inverter controller of the motor drive device interrupts the operation of the inverter in the mode transition period in which the mode changes from Motor Drive mode to Battery Charge mode.

8. The motor drive device of claim 6, wherein the inverter controller of the motor drive device is equipped with an inverter driving circuit which performs position-sensing control by using the output of a sensor which detects the position of the rotor of the AC motor in the Motor Drive mode.

9. The motor drive device of claim 6, wherein the inverter controller of the motor drive device is equipped with an inverter driving circuit which performs position-sensorless control by estimating the rotor of the three-phase AC motor in the Motor Drive mode.

10. A motor drive device equipped with a three-phase AC motor, an inverter, a rechargeable battery, and an inverter controller and capable of doubling as a device to control charging of the rechargeable battery, wherein the inverter controller of the motor drive device comprises a connection judging section which inputs a voltage value detected on the terminals connected to the charge power supply, compares the detected voltage value by a predetermined voltage value, and outputs whether the charge power supply is connected, a mode switch controller which inputs the output from the connection judging section and switches, after a predetermined mode transition period, between a Motor Drive mode which converts a DC voltage of the rechargeable battery into a three-phase AC voltage by the inverter and supplies the three-phase AC voltage to the three-phase AC motor and a Battery Charge mode which supplies the DC voltage from the rechargeable battery to the inverter through a winding of the three-phase AC motor and drives semiconductor switching devices of the inverter to charge the rechargeable battery, and an inverter driving circuit which outputs signals to drive semiconductor switching devices of the inverter; and a module in which the inverter and the inverter controller are mounted on the same package.

11. The motor drive device of claim 10, wherein the inverter controller of the motor drive interrupts the operation of the inverter in the mode transition period in which the mode changes from Motor Drive mode to Battery Charge mode.

12. The motor drive device of claim 10, wherein the inverter controller of the motor drive device is equipped with an inverter driving circuit which performs position-sensing control by using the output of a sensor which detects the position of the rotor of the three-phase AC motor in the Motor Drive mode.

13. The motor drive device of claim 10, wherein the inverter controller of the motor drive device is equipped with an inverter driving circuit which performs position-sensorless control by estimating the rotor of the three-phase AC motor in the Motor Drive mode.

* * * * *